United States Patent [19]

Hurtgen

[11] Patent Number: 5,090,123

[45] Date of Patent: Feb. 25, 1992

[54] METHOD OF FABRICATING A LEAD TERMINATION DEVICE

[75] Inventor: Jerome P. Hurtgen, Ft. Wayne, Ind.

[73] Assignee: General Electric Company, Fort Wayne, Ind.

[21] Appl. No.: 652,164

[22] Filed: Feb. 7, 1991

Related U.S. Application Data

[62] Division of Ser. No. 381,854, Jul. 19, 1989, Pat. No. 5,007,156, which is a division of Ser. No. 213,720, Jun. 30, 1988, Pat. No. 4,880,391.

[51] Int. Cl.$^5$ .............................. H01R 43/04
[52] U.S. Cl. ............................. 29/882; 29/876; 439/814
[58] Field of Search ............... 29/596, 874, 876, 882; 439/814, 221; 310/71

[56] References Cited

U.S. PATENT DOCUMENTS

| | | | |
|---|---|---|---|
| 1,754,645 | 4/1930 | Oswald | 310/71 |
| 1,971,803 | 8/1934 | Zetsche et al. | 439/89 |
| 2,024,726 | 12/1935 | Ehrenfeld | 318/770 |
| 2,094,386 | 9/1937 | Veinott | 310/71 |
| 2,173,206 | 9/1939 | Landmeier | 439/814 |
| 2,174,652 | 10/1939 | Canser | 310/71 |
| 2,321,999 | 6/1943 | Dalton | 439/43 |
| 2,399,753 | 5/1946 | McLarn | 219/4 |
| 2,466,900 | 4/1949 | Knopp | 318/770 |
| 2,507,242 | 5/1950 | Bost | 439/49 |
| 2,543,131 | 2/1951 | Seifried | 318/770 |
| 2,552,028 | 5/1951 | Blair | 439/772 |
| 2,619,621 | 11/1952 | Brown | 318/753 |
| 2,652,506 | 9/1953 | Furnas et al. | 310/71 |
| 2,702,362 | 2/1955 | Falck | 318/770 |
| 2,722,645 | 11/1955 | Brown | 318/770 |
| 2,727,215 | 12/1955 | Brown | 439/53 |
| 2,785,324 | 3/1957 | Manney et al. | 310/71 |
| 2,922,054 | 1/1960 | Miller | 439/221 |
| 2,962,693 | 11/1960 | Ott | 439/849 |
| 3,054,078 | 9/1962 | Baschkin | 439/44 |
| 3,139,492 | 6/1964 | Cage, Jr. | 439/172 |
| 3,210,578 | 10/1965 | Sherer | 439/221 |
| 3,231,767 | 1/1966 | Powell | 310/71 |
| 3,233,129 | 2/1966 | Schaefer | 439/221 |
| 3,439,244 | 4/1969 | Donahoo | 318/770 |
| 3,440,592 | 4/1969 | Zelle | 439/108 |
| 3,453,403 | 7/1969 | Hoffman | 439/221 |
| 3,488,569 | 6/1970 | Allendorph et al. | 318/770 |
| 3,518,522 | 6/1970 | Jaffe et al. | 318/349 |
| 3,525,912 | 8/1970 | Wallin | 318/17 |
| 3,541,365 | 11/1970 | Willits et al. | 310/71 |
| 3,581,268 | 5/1971 | Akst | 439/507 |
| 3,586,940 | 6/1971 | Benirschke | 318/770 |
| 3,602,748 | 8/1971 | Locke | 439/172 |
| 3,659,188 | 4/1972 | Alexander et al. | 322/28 |
| 3,707,637 | 12/1972 | Charlton et al. | 310/71 |
| 3,715,707 | 2/1973 | Anderson | 439/721 |
| 3,771,102 | 11/1973 | Murray et al. | 439/189 |
| 3,775,733 | 11/1973 | Ege | 439/814 X |
| 3,878,318 | 4/1975 | Ziegler, Jr. et al. | 174/94 |
| 3,955,044 | 5/1976 | Hoffman et al. | 174/84 |
| 3,983,428 | 9/1976 | Bitsch et al. | 310/71 |
| 4,030,793 | 6/1977 | Hanlon et al. | 439/189 |
| 4,101,192 | 7/1978 | Baurerle et al. | 439/682 |
| 4,211,962 | 7/1980 | Grunleitner et al. | 318/254 |
| 4,272,689 | 6/1981 | Crosby et al. | 307/147 |
| 4,335,929 | 6/1982 | Abernathy | 439/358 |
| 4,386,333 | 5/1983 | Dillan | 439/218 |
| 4,390,219 | 6/1983 | Beehler | 439/92 |
| 4,405,190 | 9/1983 | Schroeder | 439/217 |
| 4,426,770 | 1/1984 | Frank | 29/596 |
| 4,429,243 | 1/1984 | Crow | 310/71 |
| 4,429,935 | 2/1984 | Lamb et al. | 439/516 |
| 4,547,689 | 10/1985 | Tsuchimoto et al. | 310/71 |
| 4,585,964 | 4/1986 | Hildebrandt | 310/71 |
| 4,601,530 | 7/1986 | Coldren et al. | 439/460 |
| 4,748,355 | 5/1988 | Anderson et al. | 439/516 |
| 4,953,385 | 9/1990 | Fisher | 29/596 |

FOREIGN PATENT DOCUMENTS 0944494 4/1949 France .................. 439/814

Primary Examiner—Carl E. Hall
Attorney, Agent, or Firm—Ralph E. Krisher, Jr.

[57] ABSTRACT

A method of fabricating a lead terminal device having a body formed of an electrically conductive sheet material. One leg of a pair of legs on the body is deformed into a generally closed loop, and opposite end sections of the one leg are arranged in overlaying engagement with each other. A flange on one of the opposite end sections of the one leg is inserted into a slot in the one leg spaced adjacent the other of the opposite end sections thereof, and a pair of openings in the opposite end sections are aligned with each other, respectively, when the opposite end sections are arranged in overlaying engagement.

13 Claims, 7 Drawing Sheets

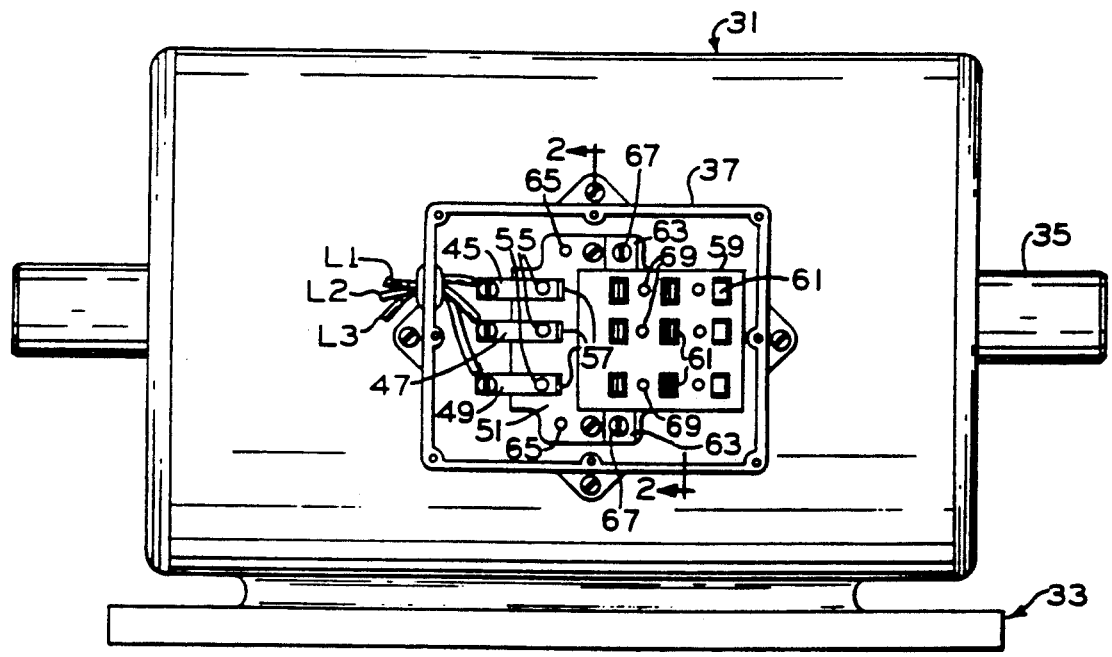
FIG. 1 (PRIOR ART)
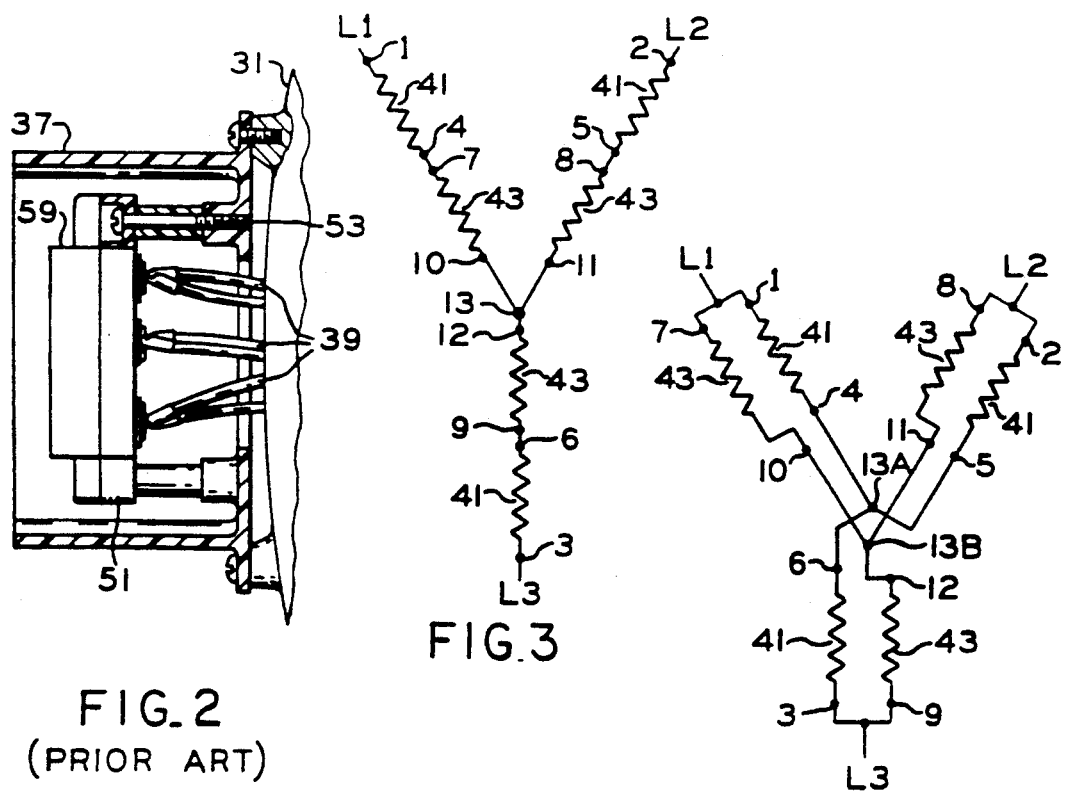
FIG. 2 (PRIOR ART)
FIG. 3
FIG. 4

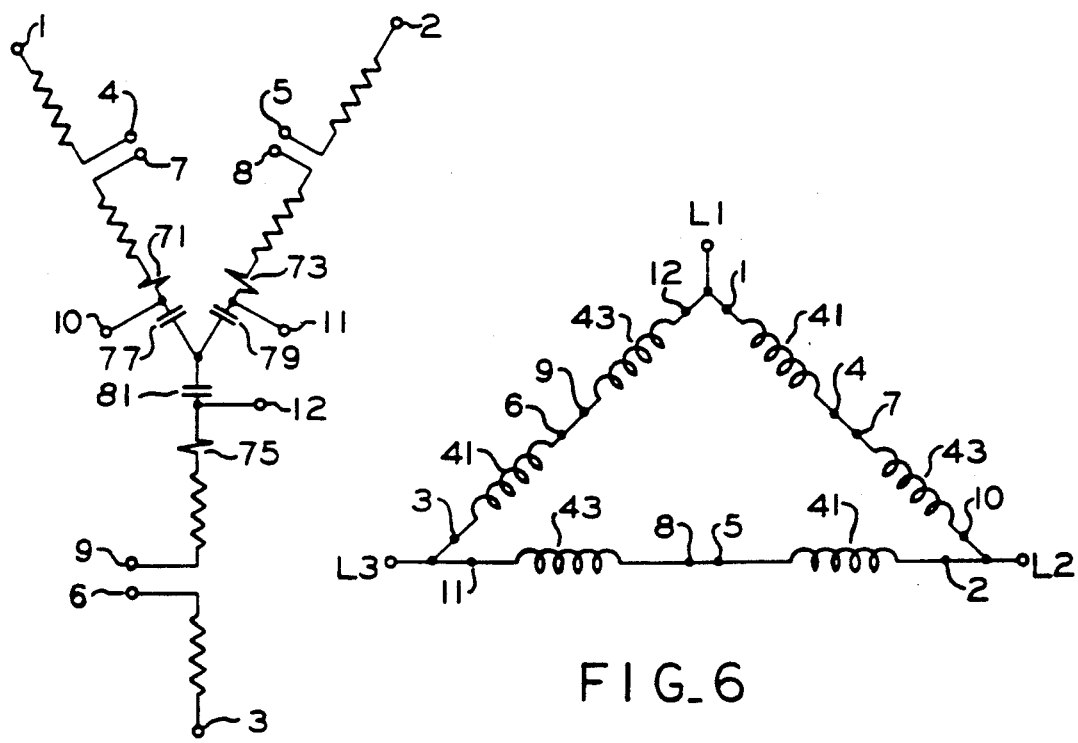
FIG_5    FIG_6
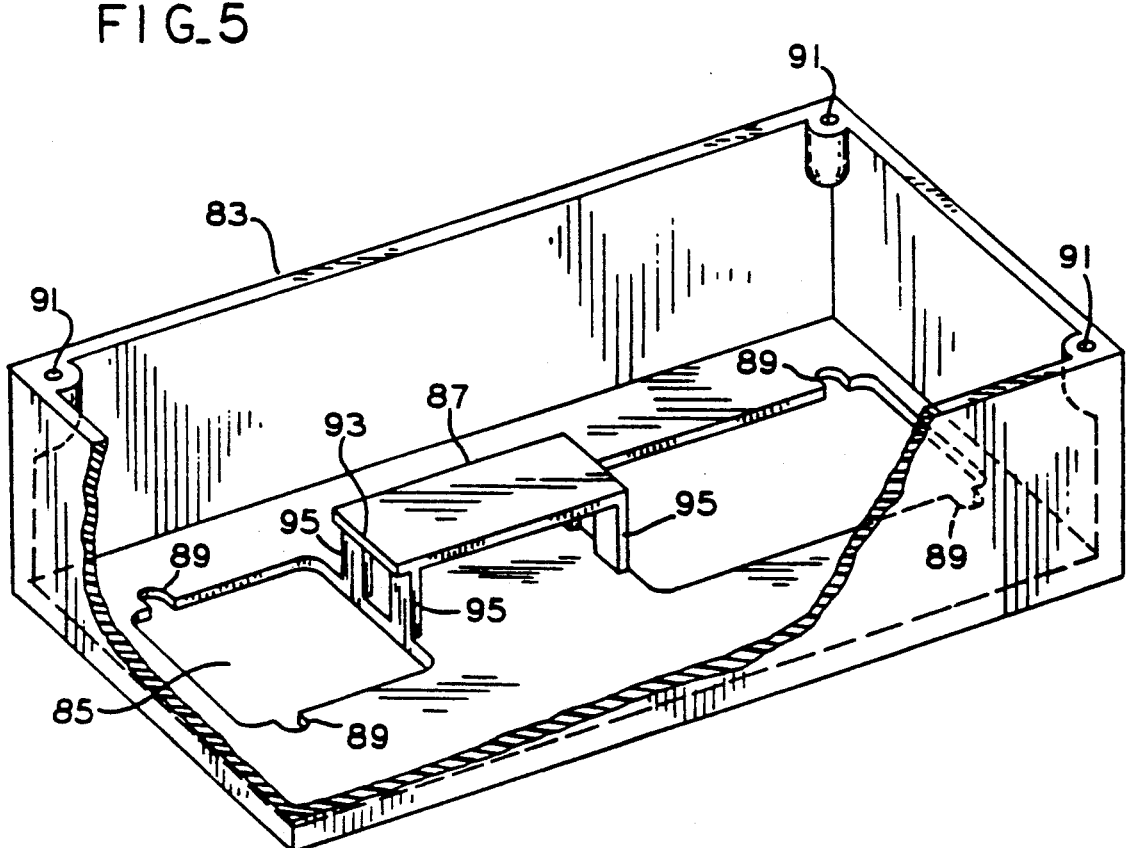
FIG_7

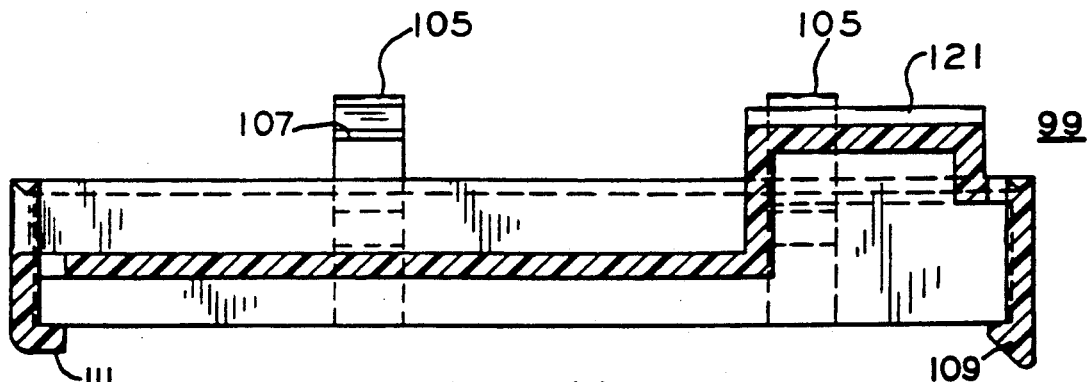
FIG._11
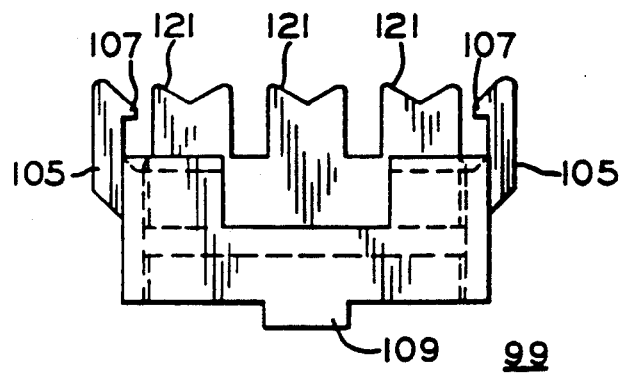
FIG._12
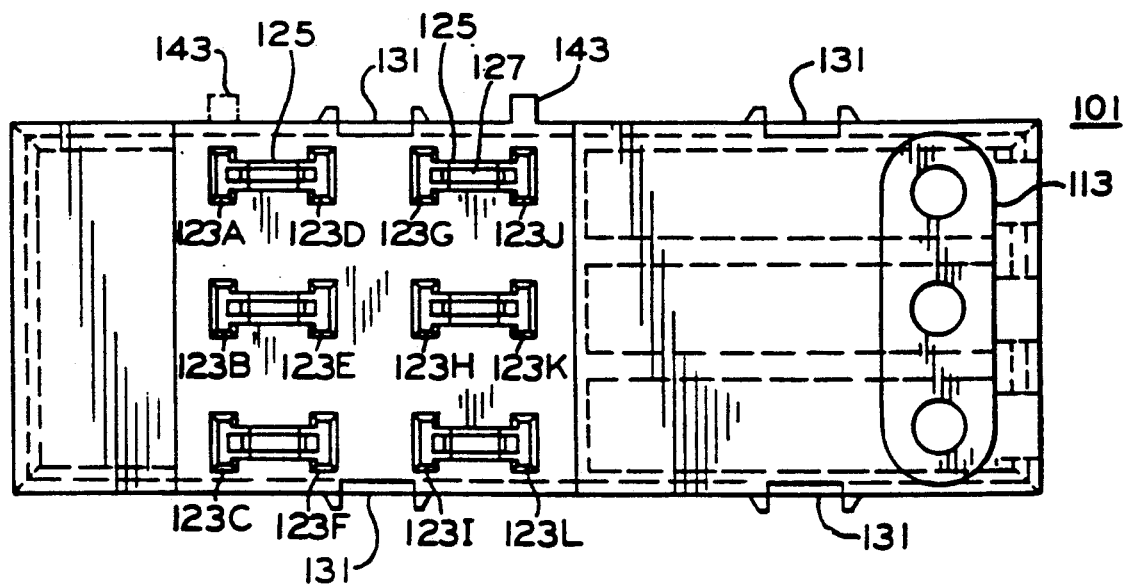
FIG._13

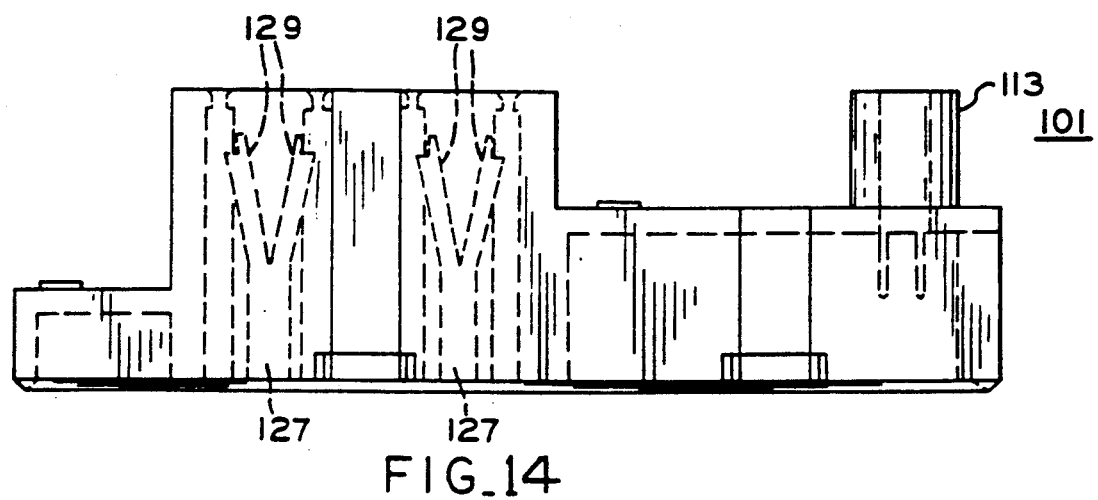
FIG_14
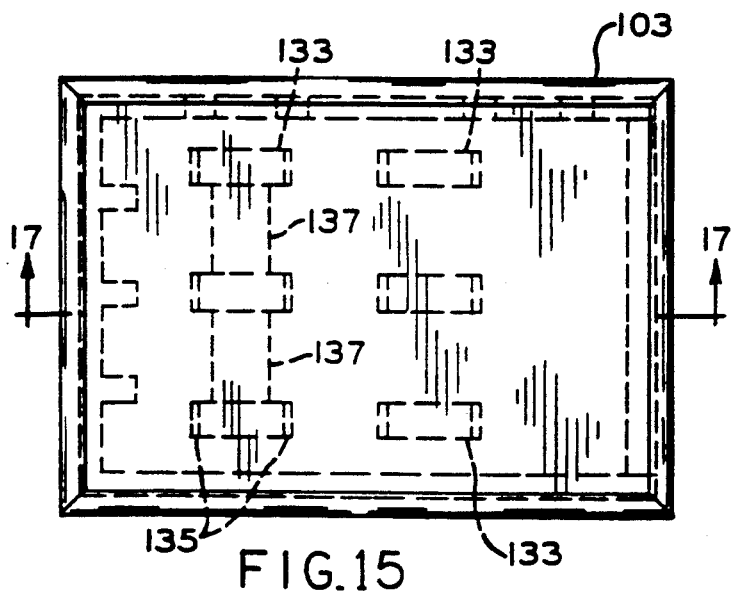
FIG_15
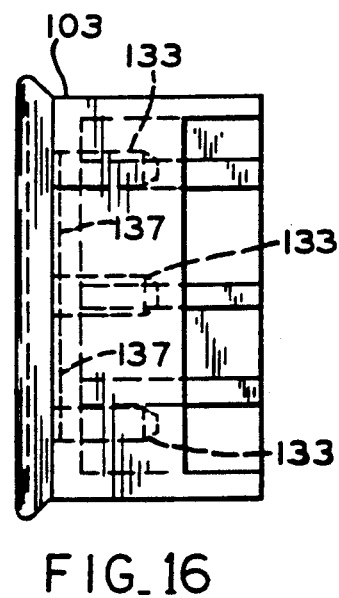
FIG_16
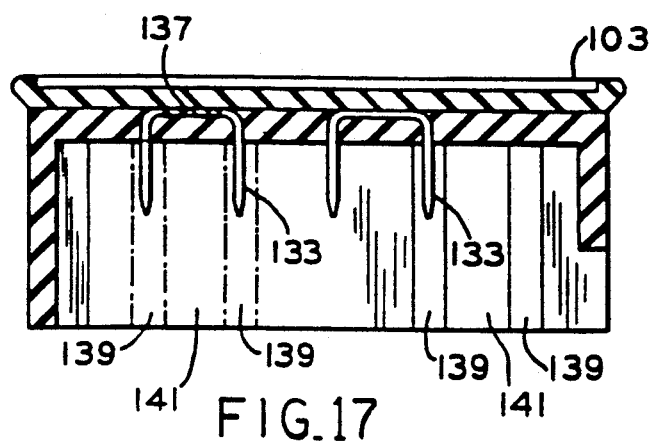
FIG_17

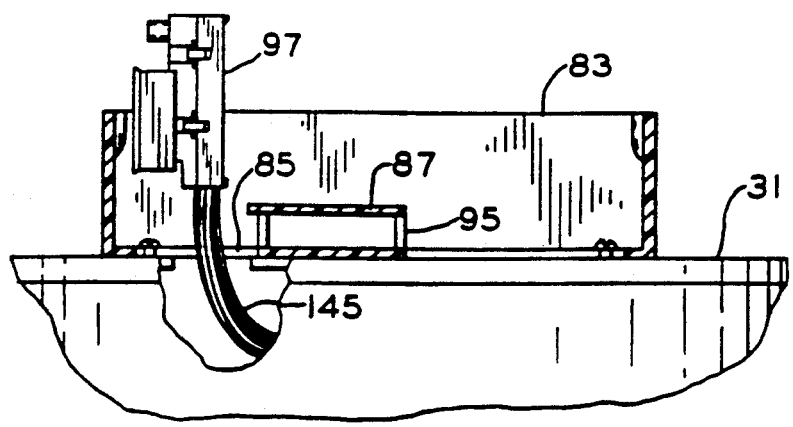
FIG. 18
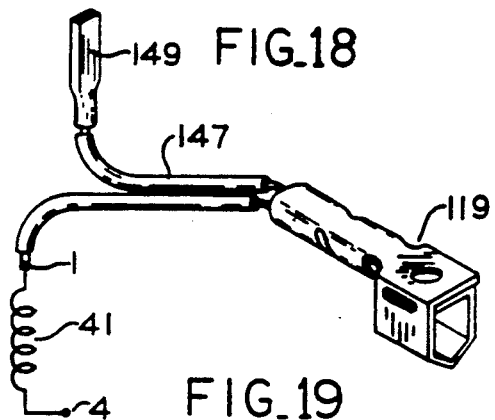
FIG. 19
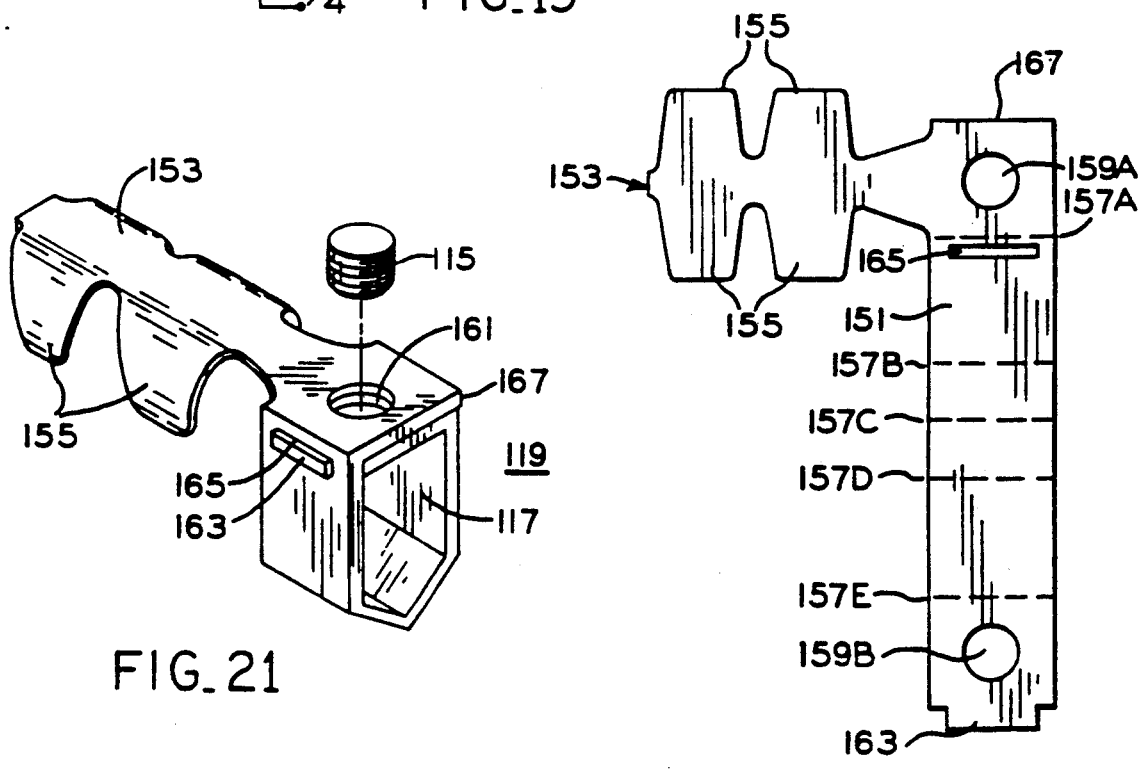
FIG. 21
FIG. 20

METHOD OF FABRICATING A LEAD TERMINATION DEVICE

This is a divisional of application Ser. No. 07/381,854 which is U.S. Pat. No. 5,007,156 filed July 19, 1989, which is a division of the commonly owned application Ser. No. 07/213,720 filed June 30, 1988 (now U.S. Pat. No. 4,880,391 issued Nov. 14, 1989).

FIELD OF THE INVENTION

This invention relates in general to dynamoelectric machines and more particularly, to a method of fabricating a lead terminal device adapted for use in such a dynamoelectric machine.

Dynamoelectric machines, such as, for example, three phase motors, are generally manufactured, in some sizes, with each phase winding of the motor stator divided into two equal size coils. The ends of each of these coils are brought out to a junction box where they are accessible for connection. Since such a motor has three phase windings, and each winding is divided into two coils, there are twelve leads brought to the junction box. The twelve leads may be connected in several different combinations in order to electrically configure the motor both into a selected type and for operation at a predetermined terminal voltage. For example, if the coils of each of the windings are connected in an electrical series circuit, the motor can be operated at twice the terminal voltage, e.g., 440 volts, as would be possible if the coils of each of the windings are connected in an electrically parallel configuration. leads, the motor windings can be electrically connected into a Wye or a delta configuration.

Because there are so many different combinations of connections of the twelve lead wires and because an error in connecting even one of the lead wires could result in destruction of the dynamoelectric machine, various types of connector or terminal blocks have been devised for terminating the coil lead wires in preselected orientations. Some of these connector blocks utilize bulky, complicated tap-changing rotary switches which, in addition to the disadvantage of large size, are generally expensive. Other forms of connector blocks have been developed in which the coil lead wires are soldered or otherwise substantially permanently attached to a base plate and a plug having preselected jumpered terminals adapted to mate with the base plate effects the interconnection of the lead wires. It is believed that at least one disadvantage of the prior connector blocks has been the manner in which the lead wires are connected. In particular, connections of which this inventor is aware are believed to require excess lead wire length. Furthermore, replacement of a damaged terminal in such systems is believed to possibly require replacement of the entire base plate.

SUMMARY OF THE INVENTION

In general, a method is provided in one form of the invention for fabricating a lead termination device lanced from an electrically conductive sheet material. The lead termination device includes a generally flat body having a pair of integral angularly arranged legs, a pair of opposite end sections on one of the legs, a flange extending beyond one of the opposite end sections, a pair of openings through the opposite end sections, respectively, and a slot through the one leg and spaced adjacent the other of the opposite end sections. In the practice of this method, the one leg is deformed into a generally closed loop, and the opposite end sections on the one leg are arranged in overlaying engagement with each other during the deformation of the one leg. The flange on the one opposite end section is inserted into the slot in the one leg spaced adjacent the other opposite end section, and the openings in the opposite end sections are aligned with each other upon the arrangement of the opposite end sections in overlaying engagement with each other.

BRIEF DESCRIPTION OF THE DRAWINGS

FIG. 1 illustrates a dynamoelectric machine with an open external conduit box incorporating a prior art interconnection device;

FIG. 2 is a partial cross-sectional view taken along the lines 2—2 of FIG. 1;

FIGS. 3-6 are diagrammatic representations of various field winding arrangements for a three-phase dynamoelectric machine;

FIG. 7 is a partial cutaway perspective view of a conduit box for the dynamoelectric machine;

FIG. 11 is a cross-sectional view of a base portion of the interconnection device of FIG. 8;

FIG. 12 is an end view of the base portion of FIG. 11;

FIG. 13 is a top planar view of a connection block portion of the interconnection device of FIG. 8;

FIG. 14 is a side planar view of the connection block portion of FIG. 13 with internal features shown in phantom;

FIG. 15 is an elevation view of the plug member portion of the interconnection device of FIG. 8 showing internal elements in phantom;

FIG. 16 is an end view of the plug member portion of FIG. 15;

FIG. 17 is a cross-sectional view of the plug member portion of FIG. 15 taken along the lines 17—17;

FIG. 18 is a partial cross-sectional view of the conduit box of FIG. 7 mounted on the dynamoelectric machine;

FIG. 19 illustrates a lead termination device connected with the, motor winding and a termination or quick connect fitting for the interconnection device; and FIGS. 20-21 illustrate the lead termination device of FIG. 19 in more detail to illustrate principles which may be practiced in a method of forming or fabricating a lead termination device in one form of the invention.

DETAILED DESCRIPTION OF THE INVENTION

Figure 5A:
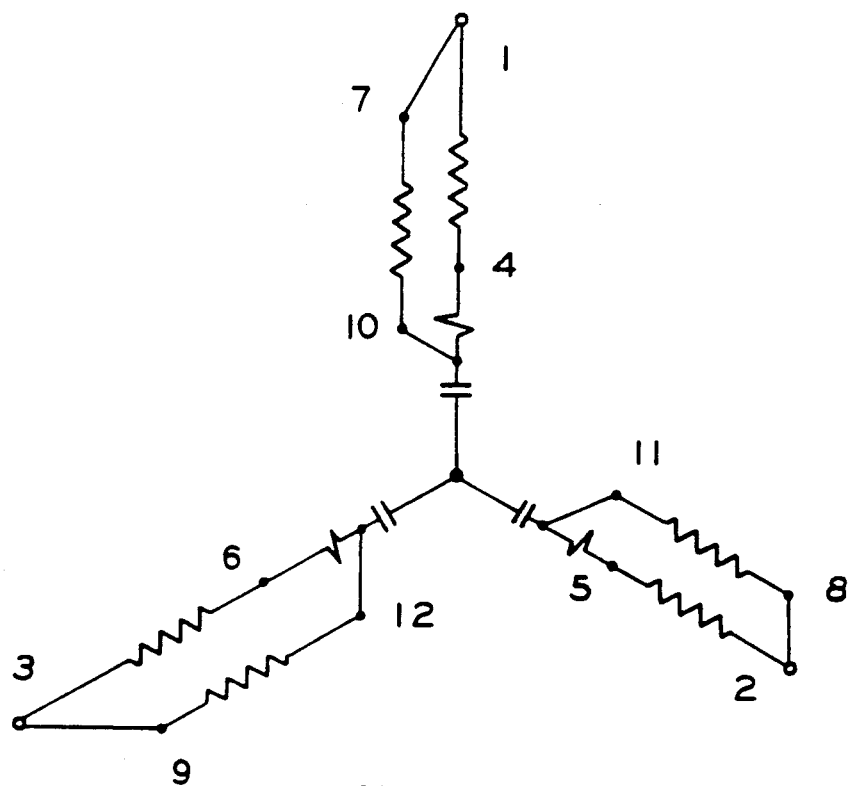

Referring now to the drawings in general and with reference first to FIGS. 1 and 2, there is shown a profile view of a dynamoelectric machine or electric motor 31 mounted on a pedestal 33 and having a double-ended shaft 35 extending therefrom. Attached to a housing of the motor 31 is a junction box or conduit box 37 into which motor leads 39 as well as power lines L1, L2 and L3 are led for appropriate connection. The conduit box and connection apparatus of FIGS. 1 and 2 are typical of prior art devices. By reference to FIG. 2 which is a cross-sectional view taken along the lines 2—2 of FIG. 1, a particular connection of the motor leads to the conduit box can be seen. Before describing the particularities of the motor connections, reference is also made to FIGS. 3 and 4 which illustrate two alternative phase winding connections of a three-phase motor which allows the motor to operate from, for example, 440 volts or 220 volts AC. In the higher voltage connection of FIG. 3, the power line terminals L1, L2 and L3 are connected to motor lead terminals 1, 2 and 3, respectively. Each of the windings of each phase are serially connected between the corresponding power lead and a common junction 13. For purposes of discussion, one of the windings in each phase has been labeled as 41 and the other windings in each phase are labeled as 43. The leads for each winding of each phase are labeled in a conventional manner indicating that there are actually twelve motor leads which must be connected for each possible configuration. In the connection diagram of FIG. 4, it can be seen that the windings 41 and 43 of each phase are electrically connected in parallel. While the connection shown in FIG. 4 indicates that there are two separate common connections 13A and 13B, it will be appreciated that these connections may be interconnected to form a single common terminal.

The apparatus located within the conduit box 37 provides one form of interconnection of the winding leads to achieve either the circuit connection of FIG. 3 or the circuit connection of FIG. 4 depending upon the desire of the motor user.

Referring back to FIG. 1, the power lines L1, L2 and L3 are connected to electrically conductive members 45, 47 and 49, respectively, which are in turn connected to the stationary portion 51 of the connecting apparatus. The portion 51 comprises an insulating panel adapted for being fixedly mounted in the conduit box by means of the screws 53 as shown in FIG. 2. The conducting members 45, 47 and 49 are each secured in position on panel 51 by means of a corresponding stud 55 which receives a clamping screw on the backside of the panel 51 for connection thereto of one of the motor leads. The ends of the members 45, 47 and 49 adjacent the points at which they are secured by the studs are turned upwardly to form extending tangs 57 above the surface of the panel 51. There is also provided a second row of studs (not shown) arranged in alignment with the studs 55, with each of the studs of the second row also comprising a clamping screw in the back for connection to one of the motor leads while on the front side of panel 51 each of the studs of the second row has a member which is turned upwardly like portion 57 of the members 45, 47 and 49. A third row of studs is also provided in panel 51 and are likewise provided with clamping screws for clamping motor leads to the associated studs, each of the studs of the third row also including a turned up member connected on the front side of panel.

The above described arrangement of panel 51 and mounting studs is such that the power lines L1, L2 and L3 can be connected with the members 45, 47 and 49 with the nine motor leads previously identified being clamped under the screws associated with corresponding ones of the rows of studs. The motor leads are connected with the studs so that the outer ends of the portions 41 of the windings, as they are viewed in FIGS. 3 and 4, are clamped by the screws associated with the studs 55 of the first row. The outer ends of the inner portion 43 of the windings are clamped by the screws associated with the second row of studs and the inner ends of the outer portions 41 of the windings are clamped by the screws 53 on the last row of studs.

In order to interconnect the windings, there is provided an adjustable member 59 having a plurality of apertures 61 distributed such that the upturned portions 57 and the upturned portions of the other studs will extend into the apertures. The member 59 comprises a panel of electrically insulative material having mounting ears or lugs 63 with holes that are adapted for registering with, for example, the threaded holes 65 on panel 51. When member 59 is positioned such that the holes in lugs 63 register with holes in panel 51 aligned with screws 67, the member 59 occupies a position on panel 51 as is illustrated in FIG. 1. If the member 59 is adjusted so that the holes in lugs 63 register with holes 65, the member 59 will be seen to be shifted towards the left hand side of the figure so that different ones of the upturned portions of the first, second and third rows of studs will be interconnected through the apertures 61 within the member 59.

Secured to one side of the member 59, such as by rivets 69, are U-shaped contacting strips (not shown) having their ends turned up so as to extend into the apertures 61. The turned up ends of the contacting strips are resilient and when member 59 is disassembled from panel 51, the turned up portions flex and extend nearly across the apertures 61. When the member 59 is mounted on panel 51, however, the bent up portions will yield electrical contact with the upstanding members or tangs, such as tangs 57, of the rows of studs. Screws 67 are utilized for clamping the member 59 in position on panel 51.

When the member 59 is mounted on panel 51 in its left hand position, as the parts are viewed in FIG. 1, member 59 serves to interconnect the inner ends of the outer portions 41 of the motor windings and to interconnect power lines L1, L2 and L3 with the outer ends of the inner portion 43 of the windings whereby lower voltage operation of the motor is attained. However, when the member 59 is adjusted to its right hand position, as it is viewed in FIG. 1, only the inner contacting strips are effective and they serve to interconnect the outer ends of outer portions 41 of the windings with the outer ends of the inner portion 43 whereby higher voltage operation of the motor can be obtained by interconnection as shown in FIG. 3.

It is believed that there may be a number of disadvantages to the above recited motor coil interconnection apparatus as shown in FIGS. 1 and 2. For example, it is believed to be difficult to assemble the motor coil leads to the apparatus without having an extended amount of lead wire available for interconnection since all connections require screwdriver access. This in turn is believed to require that excess space must be provided for storage of the excess lead wire. Still another disadvantage is believed to be that the apparatus of FIGS. 1 and 2 does not provide means for interconnecting motor coils in which current overload devices are incorporated in the motor. Note that only provision for nine lead interconnection is available. An example of an electrical schematic for a motor in which current overload devices are included is shown in FIG. 5. In that figure, the sensing devices are shown at 71, 73 and 75 and the contacts coupled to each of the devices are indicated at 77, 79 and 81. For motors in which it is desirable to include overload current protection, it will be appreciated that twelve lead interconnection is necessary.

Figure 6A:
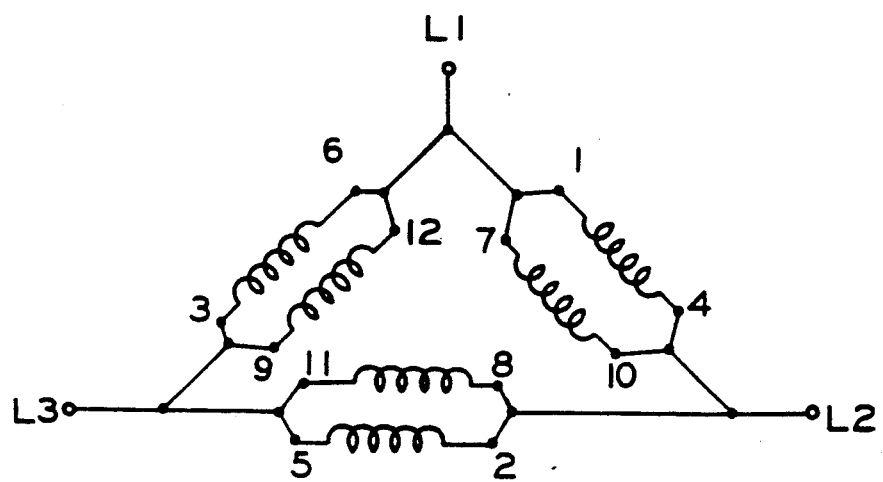

It is also desirable to be able to connect the motor coil winding in either a WYE configuration as shown in FIGS. 3, 4 and 5, 5A or in a delta configuration of types shown in FIG. 6, 6A. The terminal numbers for each of the lead wires for each coil section of the motor have been maintained the same as for FIGS. 3, 4 and 5 in order to illustrate the manner in which the respective lead wires are interconnected in order to form the configuration.

Turning now to FIG. 7, a conduit box indicated at 83 is shown in a partial cutaway perspective view to include an opening or aperture 85 for admitting leads from the windings or winding means of the motor into the conduit box and a mounting table 87 for mounting an interconnection device or coil interconnection apparatus in a manner hereinafter described. A plurality of mounting slots 89 are positioned in the bottom or base wall of the conduit box 83 for allowing the conduit box to be attached to a motor housing or housing means such as by screws. It will of course be appreciated that the slots 89 could be replaced by apertures through the lower surface of the box or by extended external tabs outside of the box. An end edge or surface on the sidewalls of conduit box 83 also includes threaded screw receiving receptacles 91 at each corner thereof to allow attachment of a cover plate over the box. For purposes of simplicity of the description, the coil interconnection apparatus will be hereinafter referred to as a interconnection device or ICD since the primary function of interconnecting the coil lead wires in different configurations is generally to vary the voltage at which the motor is to be operated. While the mechanism may also incorporate a change from a WYE connection arrangement to a delta connection arrangement, within each of those arrangements, the apparatus further provides for reconnection of the motor coils in order to allow operation at different voltages. However, each plug device can only accommodate a voltage change. To effect a change from delta to WYE requires a different plug device. Furthermore, the winding arrangements for delta and WYE wound motors are different so that interconnection blocks are desirable. Each of these blocks and their associated plug devices are keyed to prevent improper connection. As can be seen, the table 87 extends slightly above the bottom surface of the conduit box 83 and has at least one end 93 which extends beyond the supporting legs 95 of the table. Preferably, the conduit box 83 is a cast aluminum box which can be molded in one piece to form a complete box. If the box were molded plastic, the base member 99 could be integral with the box.

Figure 8:
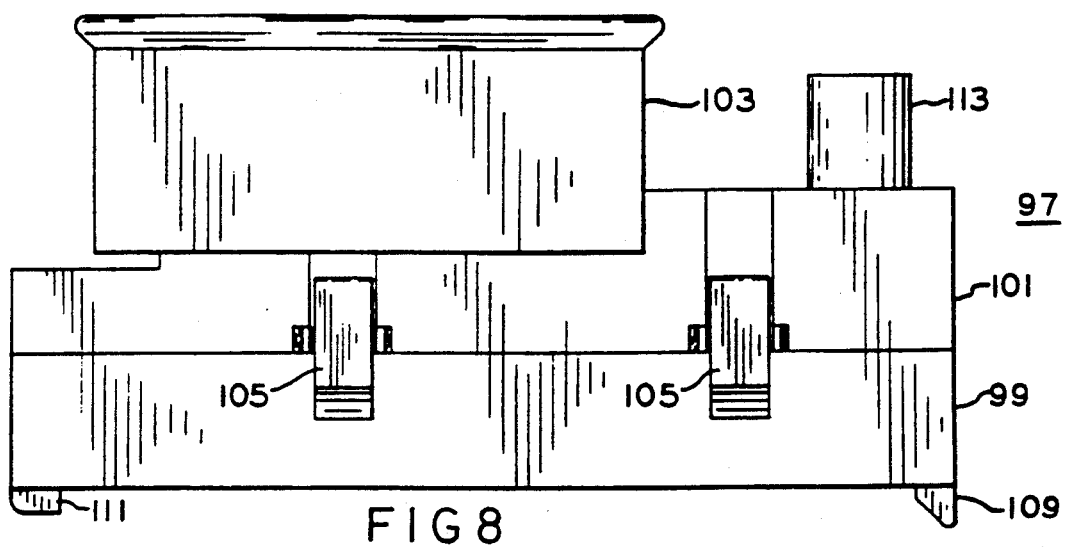
FIGS. 8-10 are side, end and top planar views, respectively, of an interconnection device for the dynamoelectric machine.
Figure 9:
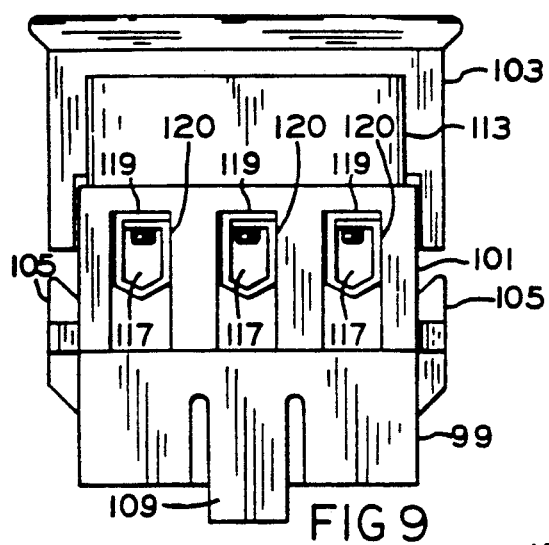
Figure 10:
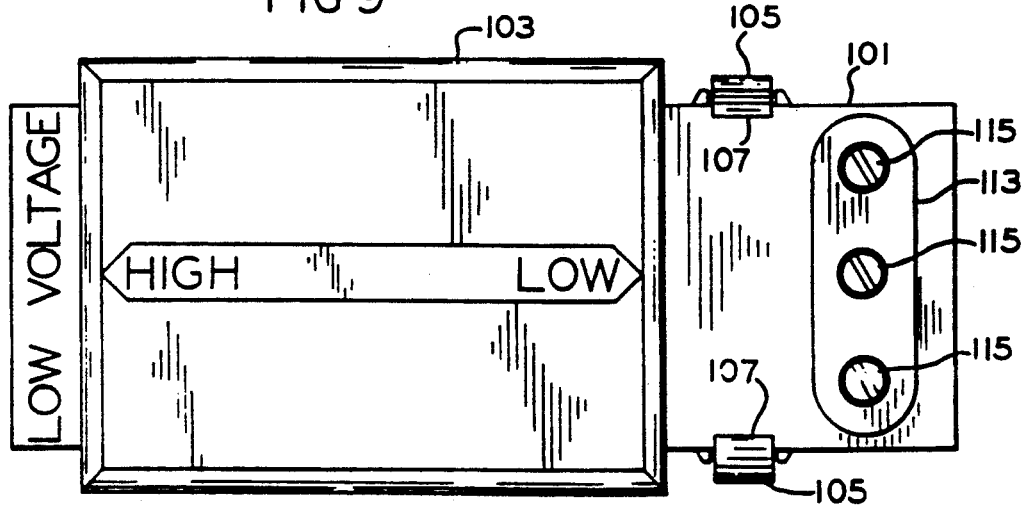

Referring generally to FIGS. 8, 9 and 10, there is shown a side view, an end view and a top view, respectively, of a interconnection device or ICD 97. The ICD 97 can be seen to comprise a base 99, a connection or terminal block 101 and a plug or plug means 103. These three primary elements of the ICD 97 are preferably formed from molded plastic so as to provide electrical insulation and to incorporate integral fingers and tangs as will be hereinafter described. In particular, the base 99 includes four upwardly extending flexible fingers 105 having inwardly directed portions 107 designed to engage upper surfaces of the connection block 101 so as to releasably fasten the base to the connection block. The base 99 also includes a downwardly extending finger, such as a catch or latch 109, on one end thereof and a lip 111 formed on an opposite end thereof. The finger 109 and lip 111 are utilized for releasably attaching the base 99 to the table 87 in conduit box 83. Mounted on top of the connection block 101 is a screw housing 113 containing screws 115 for compression and electrical connection of power lines L1, L2 and L3 which are inserted into the slots 117 located in the connection block 101.

Terminal means, such as lead termination or lead termination devices 119, are positioned in each of the slots 117 of connection block 101. As shown in FIG. 10, the plug 103 has printed labels on the top thereof for indicating how the plug is to be shifted for reinsertion to interconnect the motor windings for either a high or low voltage operation. When the plug is shifted to the right as shown in FIG. 10, the motor windings are selectively connected in one of two different electrical configurations for low voltage operations, as is indicated by the exposed "LOW VOLTAGE" label on the left end of the ICD 97. When the plug is shifted towards the left, the low voltage label is covered and a "HIGH VOLTAGE" label exposed adjacent the right of plug 103 wherein the motor windings are selectively connected in another of the aforementioned two different electrical configurations for high voltage operation.

FIGS. 11 and 12 illustrate the construction of the base member 99 in more detail. In particular, FIG. 11 is a cross-sectional view of the base 99 showing the details of the depending finger member 109 and lip 111. As will be appreciated, the base 99 can be attached to the table 87 by canting the base at an angle so that the lip 111 engages the lower surface of the lip 93 of table 87. The base 99 is then rotated clockwise about the engagement point on lip 93 so that the finger member 109 is brought down so as to latch in releasable engagement onto the opposite end of the table 87 to hold the base in position on an upper or abutment surface of the table. One of the advantages of this arrangement is believed to be that when the assembled ICD 97 is positioned in a preselected orientation over the aperture 85 it is only necessary to rotate the ICD 97 clockwise into a different preselected configuration in order to firmly seat and attach it to the conduit box 83. This advantageously assures that the lead wires from the coil sections of the motor need only be sufficiently long to extend into the conduit box since the ICD 97 can be positioned on its end while the lead wires are connected to ICD 97. This is especially important where the lead wires are extensions of the coil magnet wire rather than stranded wire connected to the coil ends. FIG. 12 is an end view of the base 99 and illustrates three upwardly directed flanges 121 which are utilized to press the terminal members 119 into the apertures 117 and to thereby secure the members 119 within those apertures. FIG. 12 also shows a clearer view of the side latching members 105 for attaching base 99 to connection block 101.

FIGS. 13 and 14 are top and side views, respectively, of the connection block 101. FIG. 13 illustrates twelve apertures 123A through 123L, each of which is adapted to receive a terminal connected to a corresponding one of the coil lead wires from the motor 31. As can be seen in FIG. 13, the apertures are arranged in pairs with a slot 125 connecting each pair of apertures. The slots 125 include retention pins 127 which have outwardly extending members 129 which extend into the apertures 123. The members 129 are plastic members that are biased to flex towards a corresponding one of the apertures 123. As can be seen in FIG. 14, each of the pins 127 incorporates a pair of the extending members 129. As will become apparent, each of the apertures 123 is sized to admit an electrically conductive connector having a receiving end for receiving a depending electrical connector from the plug 103 for interconnecting selected ones of the terminal means positioned within the apertures 123. For structural integrity and for providing adequate length for receiving the terminations of the coil lead wires, that portion of the connection block 101 in which the apertures 123 are positioned will be seen to be thicker than the remainder of the block 101.

Albeit not shown for the purpose of drawing simplification the power leads L1, L2 and L3 are connected to the connection block 101 at the right hand end by means of the termination means located in slots 117 of the block, as viewed 119 in FIG. 9. The termination means 119 includes a portion which can be crimped to connect to the coil lead wires (labeled 1, 2 and 3 in FIGS. 3–6) which are always directly connected to the incoming power lines L1, L2 and L3. In addition, it is desirable to crimp an additional wire to the lead termination devices 119, which additional wire terminates such as a quick connect fitting or the like for instance, in an electrical terminal positioned in one of the apertures 123 within the connection block 101.

It will also be noted that the connection block 101 includes slotted areas 131 which serve as guides and restraining elements for the upwardly directed fingers 105 from the base member 99. These slots 131 assure the accurate positioning of the connection block 101 onto the base member 99.

Turning now to FIGS. 15, 16 and 17, there is shown respectively, a top view, an end view and a cross-sectional view taken along the line 17—17 of the plug member 103. The plug member 103 is preferably a molded plastic member in which a plurality of electrically conductive terminals 133 are molded. As viewed in FIGS. 15 and 17, the electrically conductive terminals 133 can be seen to be U-shaped terminals serving to interconnect adjacent pairs of terminations within the apertures 123 of the connection block 101. In one embodiment, the electrical conductive terminals 133 of two rows of terminals indicated generally at 135 may be electrically interconnected by a common bus 137. Considering the electrical diagrams of FIGS. 3 and 4, if the plug member 103 is inserted so that the terminals 133 enter each of the apertures 123A–123L, the electrical connection of FIG. 4 will be implemented except that common terminals 13A and 13B will be connected. Separation of these common terminals can be achieved by eliminating the common bus 137 or by internal connection within the motor and use of only nine leads. If the plug member 103 is shifted to the left as viewed in FIG. 13, the electrical connection of FIG. 3 will be implemented.

Other forms of electrical interconnection can be implemented by changing the terminal structure within plug member 103. It will be noted that plug member 103 includes pairs of several internal ribs 139 extending from top to bottom. These ribs 139 define slots 141 which cooperate with an external protrusion 143 on connection member 101 to guide plug member 103 during insertion of member 103 onto member 101. A different protrusion 143 and pairs of ribs 139, indicated at in phantom, would be used for a different type motor, e.g., one with overload protection. Furthermore, the ribs prevent interchange of one plug with another, i.e., a plug for a one-delta, two-delta motor cannot be interchanged with a plug for a one-wye, two-wye motor. Such guiding is desirable to assure proper insertion of the plug member and to prevent bending of the terminals 133 if the plug member is misaligned.

Turning to FIG. 18, there is shown a cross-sectional view of conduit box 83 and ICD positioned for final assembly. The lead wires 145 from the motor windings exit the motor housing and enter directly into conduit box 83 via aperture 85. The wires 145 enter the ICD 97 through its lower end as viewed in FIG. 18 and terminate in terminals inserted into apertures 123A–123L. The three lead wires from winding ends 1, 2 and 3 are first connected to terminal member 119 (see FIG. 19) and a short wire or lead 147 then leads from member 119 to a termination such as for instance a releasable connector or quick connect fitting 149 or the like adapted to be inserted in apertures 123J–123L.

As will be appreciated from an examination of FIG. 19, the lead wires 145 are terminated in lead termination devices such as that illustrated at 119. Such devices are either crimped, soldered, or welded to the lead wires or coil ends and then inserted into corresponding ones of the apertures 123. During the assembly process, the base member 99 and plug member 103 are disconnected from the connection block 101 thus enabling the terminated lead wires to easily coupled to the block 101. Only sufficient wire length to reach from motor 31 to just above the upper surface of table 87 is required for such assembly. With the lead wires coupled to block 101, the base 99 is latched to block 101 by means of latching fingers. The assembled base and block is then rotated clockwise, catching flange 111 on lip 93 of table 87, until the base 99 sits flat on table 87 and latching finger 109 snaps onto table 87 at the end opposite lip 93. A plug member 103 can then be inserted onto block 101 to select an appropriate interconnection of the motor windings. A cover means or cover (not shown) may be releasably attached to the conduit box 83 using screws into the threaded apertures 91. For integrity of the assembly, the height of the conduit box is selected such that the cover will contact the top surface of plug 103 and prevent undesirable separation of the assembled ICD.

As best seen in FIGS. 19-21, lead termination device 119 may be lanced, stamped or punched from a generally thin electrically conductive sheet material into the form shown in FIG. 20. In this form, there is a rectangular portion, such as for instance a generally rectangular or elongate strip or leg 151, and a tabbed portion or leg 153 extending generally angularly, i.e. generally at a right angle as seen in FIG. 20, from one end of the portion 151. The tabbed portion 153 includes multiple tabs 155 which can be bent or otherwise deformed as shown in FIG. 21 for crimping leads to the lead termination device 119.

The rectangular portion 151 is embossed at lines 157A–157E to facilitate forming the portion 151 into the multi-sided closed loop configuration shown in FIG. 21. As the portion 151 is successively bent or otherwise deformed at the embossed lines 157A–157E, the multi-sided closed loop configuration of the portion 151 defines an opening 158 therethrough 117 is formed. The holes 159A and 159B in the overlaid opposite end portions or end sections of the deformed leg 151 align to create an aperture 161 for receiving clamping screw 115 in threaded engagement so as to retain the overlaid opposite end sections of deformed leg 151 in one side of the closed loop against displacement from each other. A tab or flange 163 is formed on one of the opposite ends or end edges of deformed leg 151 and dimensioned to fit through slot 165 adjacent another of the opposite ends or end edges of deformed leg 151. Note that the tab 163 extends outwardly beyond a side of the closed loop formed by deformed leg 151. Also, the length of the section of portion 151 between tab 163 and line 157E is less than the length of the section between line 157A and opposite end 167. This length difference causes end 167 to extend outwardly beyond the side of the closed loop formed by deformed leg 151. The purpose of the extending distal ends of tab 163 and opposite end 167, is to provide edges which can be used to retain lead termination devices 119 within the slots 117 in connection with block 101 during assembly prior to attachment to base 99. The extending distal end of tab 163 and opposite end 167 make lead termination devices 119 slightly winder than slots 117 thereby to "bite" into the plastic material of block 101. If desired, the tab 163 and end 167 may be formed with tapered edges to ease insertion but oppose removal.

Another disadvantage of the construction of lead termination devices 119 is believed to be the added stiffness about the closed loop formed by deformed leg 151 achieved by passing the tab 163 through the slot 165. Support of the opposite end section of the deformed leg 151 between line 157E and tab 163 in this manner facilitates threading of the opening 161 and better supports the compression screw 115.

While only certain preferred features of the invention have been shown by way of illustration, many modifications and changes will occur to those having ordinary skill in the art. It is, therefore, to be understood that the present claims are intended to cover all such modifications and changes which fall within the true spirit of the invention.

What I claim as new and desire to secure by Letters Patent of the United States is:

1. A method of fabricating from a generally thin electrical conductive sheet material a lead termination device for connection with a winding lead of a dynamoelectric machine and a power lead therefor, the lead termination device including a generally flat body having a first generally elongate rectangular leg with a pair of generally opposite side edges interposed between a pair of generally opposite end edges, a pair of openings through the first leg and spaced adjacent the opposite end edges, respectfully, a flange on one of the end edges extending therebeyond, a slot through the first leg interposed between the openings and spaced adjacent the other of the opposite end edges, a plurality of predeterminately spaced apart embossed lines in the first leg interposed between the openings and extending between the opposite side edges, respectively, and a second leg on the body integrally formed with one of the opposite said edges adjacent the other opposite end edge so as to extend generally perpendicularly with respect to the first leg, the second leg having a set of deformable tabs extending therefrom, the method comprising the steps of:

bending the first leg generally at each embossed line therein;

forming the first leg into a multi-sided closed loop in response to the bending step;

overlaying a pair of opposite end portions of the first leg located between the opposite end edges and respective ones of the embossed lines adjacent thereto during the forming step with the overlaid opposite end portions defining one of the sides of the multi-sided closed loop;

inserting the flange into the slot and abutting the one end edge with another of the sides of the multi-sided closed loop adjacent the one side thereof during the overlaying step;

aligning the openings with each other so as to extend through the one side of the multi-sided closed loop during the overlaying step; and extending both a distal portion of the flange beyond the another side of the multi-sided closed loop and the other opposite end edge beyond a third side of the multi-sided closed loop adjacent the one side and opposite the another side thereof at least upon the occurrence of the abutting step.

2. The method as set forth in claim 1 wherein the lead termination device further includes a screw, and wherein the method further comprises the additional step of threadedly engaging the screw with the aligned openings in the one side of the multi-sided closed loop thereby to retain the overlaid opposite end portions against displacement from each other.

3. The method as set forth in claim 2 further comprising the further additional steps of placing a part of the power lead within the multi-sided closed loop and further threadedly engaging the screw with the aligned openings into engagement with the power lead part thereby to urge the power lead part into electrical contacting engagement with at least some of the sides of the multi-sided closed loop and to releasably retain the power lead part against displacement from the multi-sided closed loop.

4. The method as set forth in claim 1 further comprising the additional steps of associating a part of the winding lead with the second leg of the lead termination device and deforming the at least one set of the deformable tabs into electrical contacting and displacement preventing engagement with the winding lead part.

5. A method of fabricating a lead termination device from an electrical conductive sheet material, the lead termination device including a generally flat body having a generally elongate leg with a pair of opposite end edges interposed between a pair of opposite side edges, respectively, a plurality of predeterminately spaced apart embossed lines in the leg and extending between the opposite side edges, respectively, means for defining a set of deformable tabs extending from one of the opposite side edges and spaced adjacent one of the opposite end edges, and a flange on the other of the opposite end edges extending therebeyond, and a slot in the leg spaced adjacent the one opposite edge the method comprising the steps of:

deforming the leg generally at each embossed line therein;

forming the leg into a multi-sided closed loop in response to the deforming step;

arranging sections of the leg adjacent the opposite end edges in overlaying engagement with each other during the forming step with the overlaid sections defining one of the sides of the multi-sided closed loop; and inserting the flange into the slot and abutting the other end edge with another of the sides of the multi-sided closed loop adjacent the one side thereof during the arranging step.

6. The method as set forth in claim 5 wherein the arranging step further includes extending both a distal portion of the flange beyond the another side of the closed loop and the one opposite end edge beyond a third one of the sides of the closed loop with the third one side being adjacent the one side and spaced opposite the another side.

7. A method of fabricating a lead termination device lanced from an electrical conductive sheet material, the lead termination device including a generally flat body having a pair of integral angularly arranged legs, a pair of opposite end sections on one of the legs, a flange extending beyond one of the opposite end sections, a pair of openings through the opposite end sections, respectively, and a slot through the one leg and spaced adjacent the other of the opposite end sections, the other of the legs having a set of deformable tabs extending therefrom, the method comprising the steps of:

deforming the one leg into a generally closed loop;

arranging the opposite end sections of the one leg in overlaying engagement with each other during the deforming step; and inserting the flange on the one opposite end section into the slot in the one leg spaced adjacent the other opposite end section and aligning the openings in the opposite end sections with each other during the arranging step.

8. The method as set forth in claim 7 wherein the lead termination device further includes a screw, and wherein the method further comprises the additional step of threadedly engaging the screw with the aligned openings in the overlaid opposite end sections thereby to retain the overlaid opposite end sections against displacement from each other.

9. The method as set forth in claim 7 wherein the lead termination device further includes a plurality of predeterminately spaced apart embossed lines disposed between the opposite end sections and extending across the one leg, and wherein the deforming step includes bending the one leg generally at each embossed line and forming a plurality of successive sidewalls arranged in angular relation with each other in the closed loop in response to the bending step with the overlaid opposite end sections defining one of the sidewalls.

10. The method as set forth in claim 9 wherein the arranging step further includes extending a distal portion of the flange beyond another of the sidewalls in the closed loop adjacent the one sidewall thereof upon the insertion of the flange into the slot and disposing an end edge on the other opposite end section beyond a third one of the sidewalls in the closed loop portion adjacent the one sidewall and spaced opposite the another sidewall thereof.

11. The method as set forth in claim 7 wherein the lead termination device further includes an end edge on the one opposite end section, the flange extending from the end edge, and wherein the inserting step includes abutting the end edge with a part of the one leg adjacent the slot therein.

12. The method as set forth in claim 5 wherein the leg includes a pair of spaced apart openings and wherein the arranging step includes aligning the openings with each other so as to extend through the one side of the multi-sided closed loop.

13. The method as set forth in claim 12 wherein the lead termination device further includes a screw and the method further comprises the additional step of threadedly engaging the screw in the aligned openings thereby to retain the overlaid sections against displacement from each other.

* * * * *

UNITED STATES PATENT AND TRADEMARK OFFICE
CERTIFICATE OF CORRECTION

PATENT NO. : 5,090,123
DATED : February 25, 1992
INVENTOR(S) : Jerome P. Hurtgen It is certified that error appears in the above-identified patent and that said Letters Patent is hereby corrected as shown below:

Drawing sheets 4 and 7 should be corrected as follows, to appear as shown on attached pages:

In the drawings, Sheet 4, FIG. 9, the reference numerals 117 located in the connection block 101 should be deleted.

In the drawings, Sheet 4, FIG. 9, the reference numerals 120 located in the connection block 101 should be replaced with reference numerals 117.

In the drawings, Sheet 7, FIG. 21, reference numeral 117 located in the multi-sided closed loop configuration should be replaced with reference numeral 151.

In the drawings, Sheet 7, FIG. 21, reference numeral 151 located in the multi-sided closed loop configuration should be added.

In the drawings, Sheet 7, FIG. 21, reference numeral 158 located in the multi-sided closed loop configuration should be added.

Signed and Sealed this

Twenty-ninth Day of June, 1993

Attest:

MICHAEL K. KIRK

Attesting Officer

Acting Commissioner of Patents and Trademarks

UNITED STATES PATENT AND TRADEMARK OFFICE
CERTIFICATE OF CORRECTION

PATENT NO. : 5,090,123

DATED : February 25, 1992

INVENTOR(S) : Jerome P. Hurtgen

It is certified that error appears in the above-identified patent and that said Letters Patent is hereby corrected as shown below:

Sheet 4

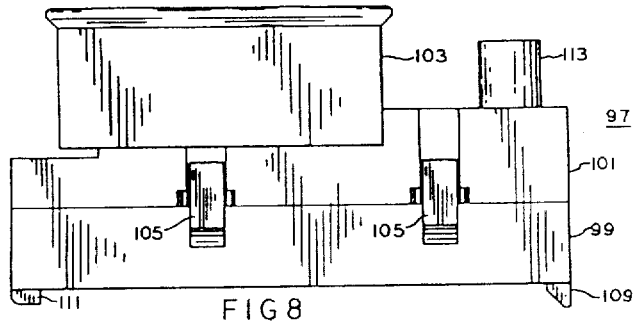

FIG 8

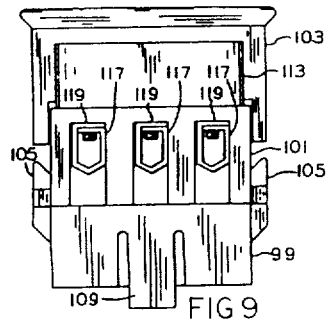

FIG 9

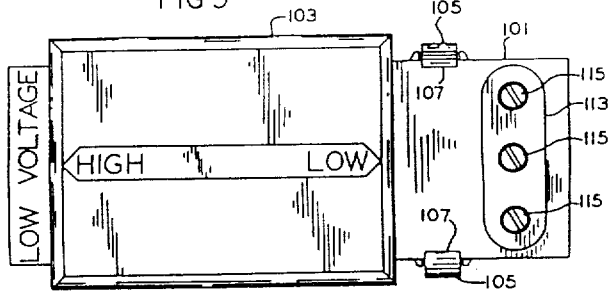

FIG. 10

UNITED STATES PATENT AND TRADEMARK OFFICE
CERTIFICATE OF CORRECTION

PATENT NO. : 5,090,123

DATED : February 25, 1992

INVENTOR(S) : Jerome P. Hurtgen

It is certified that error appears in the above-identified patent and that said Letters Patent is hereby corrected as shown below:

Sheet 7

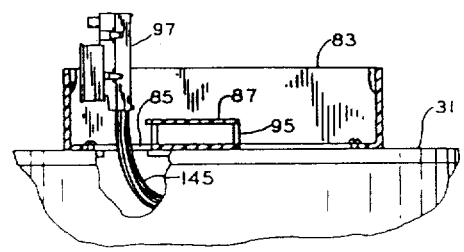

FIG. 18

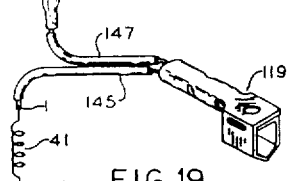

FIG. 19

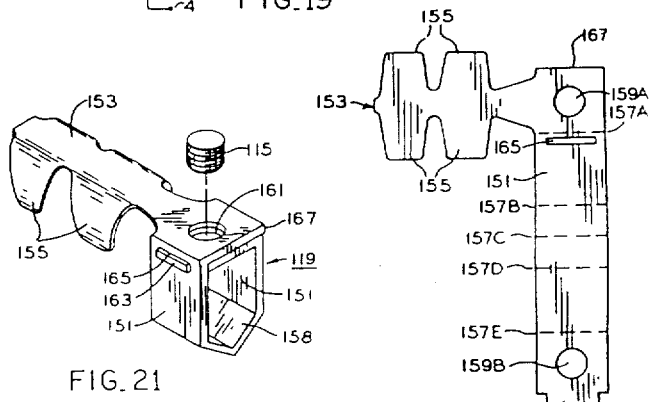

FIG. 21

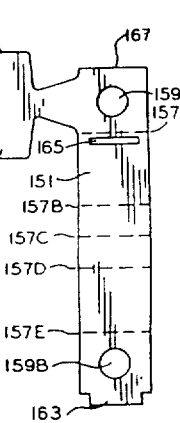

FIG. 20